(12) United States Patent
Markowicz

(10) Patent No.: US 9,884,447 B2
(45) Date of Patent: Feb. 6, 2018

(54) TOOLS FOR MAKING RETROREFLECTIVE ARTICLES

(71) Applicant: 3M INNOVATIVE PROPERTIES COMPANY, St. Paul, MN (US)

(72) Inventor: Przemyslaw P. Markowicz, Woodbury, MN (US)

( * ) Notice: Subject to any disclaimer, the term of this patent is extended or adjusted under 35 U.S.C. 154(b) by 460 days.

(21) Appl. No.: 14/390,161

(22) PCT Filed: Mar. 13, 2013

(86) PCT No.: PCT/US2013/030641
§ 371 (c)(1),
(2) Date: Oct. 2, 2014

(87) PCT Pub. No.: WO2013/151691
PCT Pub. Date: Oct. 10, 2013

(65) Prior Publication Data
US 2015/0048067 A1    Feb. 19, 2015

Related U.S. Application Data

(60) Provisional application No. 61/621,411, filed on Apr. 6, 2012.

(51) Int. Cl.
*B23K 26/24*    (2014.01)
*B21D 31/00*    (2006.01)
(Continued)

(52) U.S. Cl.
CPC ............ *B29C 59/002* (2013.01); *B23K 26/04* (2013.01); *B23K 26/14* (2013.01); *B23K 26/26* (2013.01); *B29C 59/04* (2013.01); *B29D 11/00605* (2013.01); *G02B 5/0808* (2013.01); *B23K 2201/20* (2013.01); *B23K 2203/10* (2013.01); *B23K 2203/12* (2013.01); *B29L 2011/0083* (2013.01); *Y10T 428/24355* (2015.01)

(58) Field of Classification Search
CPC .................. B29C 59/002; B29C 59/04; B29C 2011/0083; G02B 5/0808; B23K 26/26; B23K 26/24; B21D 31/00; B21D 37/00
USPC ....................... 219/121.63, 121.64; 29/33 H; 428/544–687
See application file for complete search history.

(56) References Cited

U.S. PATENT DOCUMENTS 1,591,572 A    7/1926   Stimson
3,622,743 A    11/1971  Muncheryan
(Continued)

FOREIGN PATENT DOCUMENTS

CN          101100107         1/2008
DE      10 2005 057 317       5/2007
(Continued)

OTHER PUBLICATIONS

International Search report for PCT International Application No. PCT/US2013/030641 dated May 28, 2013, 3 pages.

*Primary Examiner* — Samuel M Heinrich

(57) ABSTRACT

A tool for making retroreflective articles comprises (a) a substrate comprising a patterned surface comprising an array of microstructured retroreflective elements and (b) a welding seam through at least a portion of the array. An optically degraded area adjacent the welding seam on the patterned surface has a width of about 400 μm or less.

16 Claims, 17 Drawing Sheets

(51) Int. Cl.
  *B21D 37/00* (2006.01)
  *B29C 59/00* (2006.01)
  *B23K 26/26* (2014.01)
  *B29D 11/00* (2006.01)
  *B23K 26/04* (2014.01)
  *B23K 26/14* (2014.01)
  *B29C 59/04* (2006.01)
  *G02B 5/08* (2006.01)
  *B23K 101/20* (2006.01)
  *B23K 103/10* (2006.01)
  *B23K 103/12* (2006.01)
  *B29L 11/00* (2006.01)

(56) References Cited

U.S. PATENT DOCUMENTS

| | | |
|---|---|---|
| 3,712,706 A | 1/1973 | Stamm |
| 3,926,402 A | 12/1975 | Heenan |
| 4,478,769 A | 10/1984 | Pricone |
| 4,537,810 A * | 8/1985 | Held ............ B30B 5/04 428/156 |
| 4,588,258 A | 5/1986 | Hoopman |
| 4,601,861 A | 7/1986 | Pricone |
| 4,775,219 A | 10/1988 | Appeldorn |
| 4,938,563 A | 7/1990 | Nelson |
| 5,138,488 A | 8/1992 | Szczech |
| 5,156,863 A | 10/1992 | Pricone |
| 5,557,836 A | 9/1996 | Smith |
| 5,558,740 A | 9/1996 | Bernard |
| 5,643,400 A | 7/1997 | Bernard |
| 5,962,108 A * | 10/1999 | Nestegard ........ B32B 27/12 156/290 |
| 6,076,248 A * | 6/2000 | Hoopman ........ B24D 3/28 29/527.1 |
| 6,159,407 A | 12/2000 | Krinke |
| 6,322,652 B1 | 11/2001 | Paulson |
| 6,709,258 B2 | 3/2004 | Paulson |
| 6,843,571 B2 | 1/2005 | Sewall |
| 7,156,527 B2 | 1/2007 | Smith |
| 7,283,714 B1 | 10/2007 | Gapontsev |
| 7,410,604 B2 | 8/2008 | Erickson |
| 2004/0018790 A1* | 1/2004 | Kumar ........ B32B 3/02 442/286 |
| 2004/0175528 A1 | 9/2004 | Paulson |
| 2006/0231533 A1 | 10/2006 | Danzer |
| 2008/0106001 A1 | 5/2008 | Slafer |
| 2009/0255817 A1 | 10/2009 | Lu |

FOREIGN PATENT DOCUMENTS

| | | |
|---|---|---|
| JP | 2002-524298 A | 8/2002 |
| JP | 2011-224618 | 11/2011 |
| KR | 2004-0051989 | 6/2004 |
| WO | WO 2000/13873 | 3/2000 |

* cited by examiner

TOOLS FOR MAKING RETROREFLECTIVE ARTICLES

TECHNICAL FIELD

This invention relates to welded tools for making retroreflective articles, methods for making the tools, and retroreflective articles replicated from the tools.

BACKGROUND

Retroreflective sheeting is used in various applications including, for example, in road signs, pavement markers, license plates and clothing. Many of these applications require the sheeting to have an eye pleasing or cosmetic appearance.

One useful type of retroreflective sheeting is cube corner retroreflective sheeting. Cube corner retroreflective sheeting typically includes a sheet having a generally planar front surface and an array of cube corner reflecting elements protruding from the back side. In use, the retroreflector is arranged with the front surface disposed generally toward the anticipated location of the intended observers. In this orientation, light incident to the front surface enters the sheet, passes throughout the body of the sheet to be internally reflected by the faces of the cube corner reflecting elements so as to exit the front surface in a direction substantially toward the light source, i.e., retroreflection.

The manufacture of retroreflective cube corner element arrays is typically accomplished by employing molds or tools which may be multigenerational copies of master tools. Master tools are primarily made by known techniques such as pin bundling, laminae assembly and direct machining. Tools manufactured by pin bundling are made by assembling together individual pins which each have an end portion shaped with features of a cube corner reflective element. Tools manufactured by laminae assembly are made by assembling together individual lamina or blades which each have a side portion shaped with features of cube corner reflective elements. The direct machining technique involves cutting away portions of a substrate to create a pattern of grooves that intersect to form structures including cube corner elements. This grooved substrate is typically used as a master from which a series of impressions, replicas or molds may be formed. These are typically then used as molds for retroreflective sheeting.

Once the mold or tool is made, retroreflective sheeting can then be made by any suitable method including, for example, either by thermally embossing a plastic sheet with the tool substrate to form a molded surface or by subsequently depositing a crosslinkable, partially polymerized resin on a mold to be microreplicated, which is then typically exposed to radiation such as, for example, actinic light or heat, to solidify the resin.

Such manufacturing processes are typically continuous processes. For continuous manufacturing of retroreflective sheeting, a tool is typically formed from discrete tooling elements, which are generally flat in nature, by joining them together with one or more welding lines across their widths. The first discrete tooling element (the master) is usually created as described above and then multiple copies comprising multigenerational copies are made through electroplating. These copies are then welded together into the form of a cylinder, belt or sleeve with one or more welding lines across the width of the cylinder, belt or sleeve.

When the retroreflective sheeting is made on the tool, resin flows into the weld lines and causes seam lines to be replicated in the resulting sheeting. The seam lines can typically be observed across the width of the retroreflective sheeting. Because these seam lines reduce the cosmetics of the sheeting, attempts have made narrow them or to eliminate them. For example, U.S. Pat. Nos. 5,643,400 and 5,558,740 (both to Bernard et al.) describe an apparatus and a method for producing retroreflective sheeting wherein at least two mold surfaces are used to generate two prism arrays which are overlapped at a leading and/or a trailing edge of each array. U.S. Pat. No. 6,709,258 (Paulson et al.) describes molds for retroreflective sheeting made by welding the opposing ends of the back side of a substantially planar tooling together to form a cylindrical shape.

SUMMARY

In view of the foregoing, we recognize that there is yet a need for an improved method for making tooling for retroreflective articles with a sufficiently strong weld that is capable of producing a narrow seam line on a retroreflective article such as retroreflective sheeting.

Furthermore, we recognize that it is also of great importance in any such method to minimize the area on the tool adjacent the weld affected by the heat from the welding process. The heating and subsequent re-cooling in this area can alter the microstructure of the tool material. For example, cube corner elements in this area can become distorted and exhibit diminished or degraded retroreflectivity.

Briefly, in one aspect, the present invention provides a tool for making retroreflective articles comprising (a) a substrate comprising a patterned surface comprising an array of microstructured retroreflective elements (b) a welding seam through at least a portion of the array. An optically degraded area adjacent the welding seam on the patterned surface has a width of about 400 µm or less.

In another aspect, the present invention provides retroreflective sheeting comprising a patterned surface comprising a three dimensional array of microstructured retroreflective elements and a welding seam through at least a portion of the array. An optically degraded area adjacent the welding seam on the patterned surface has a width of about 400 µm or less.

In yet another aspect, the present invention provides a method for making a tool for retroreflective articles. The method comprises welding the ends of two substantially planar tooling elements together with a single mode laser in continuous wave mode operation to form a welded seam. Each tooling element comprises a patterned side comprising an array of microstructured retroreflective elements and a flat back side opposite the patterned side.

As used herein, "tooling" or "tool" refers to a substrate having at least one patterned surface that forms an original template from which other articles can be replicated such as a mold or retroreflective article such as retroreflective sheeting.

As used herein, "mold" refers to a structure formed by the tooling. It is the mold that typically is utilized in further replication processes in producing articles such as retroreflective sheeting.

As used herein, the term "microstructured" refers to at least one major surface having retroreflective elements with a lateral dimension (for example, distance between groove vertices of cube corner structures) of less than about 300 µm.

As used herein, "welding seam" or "welded seam" or "welding line" refers to an actual weld in a tool for making retroreflective sheeting or the replication of actual weld into a replica (including multigenerational copies thereof) of the tool.

As used herein, "optically degraded area" refers to the area adjacent a welding seam on the patterned surface of a tool for making retroreflective articles or on the patterned surface of a retroreflective article replicated therefrom wherein the retroreflective elements exhibit substantially diminished retroreflective performance due to distortion. Distortion may result from the heat generated during the welding process. One useful method for defining the optically degraded area uses a phase shifting interferometer with a suitable objective lens to measure peak-to-valley optical path differences for individual cube corner elements to determine where the transition between distorted and undistorted cube corner elements lies. Suitable objective lenses may, for example, comprise beam compressors when retroreflective elements smaller than about 0.5 mm, and preferably smaller than 0.25 mm, are utilized. The distance (measured in a direction perpendicular to the welding seam and parallel to the generally flat surface of the retroreflective cube corner elements) between the transitions of the distorted and undistorted cube corner elements on each side of the welding seam defines the width of the optically degraded area. This measurement is typically taken at the widest point of the optically degraded area that is in the usable area of the retroreflective tool or article.

The tools and retroreflective articles of the invention have very narrow weld seams and minimal areas of physical distortion in the retroreflective elements adjacent to the weld seams. In addition, the welds in the tool made using the methods of the invention are sufficiently strong for their intended application.

DETAILED DESCRIPTION

Figure 1:
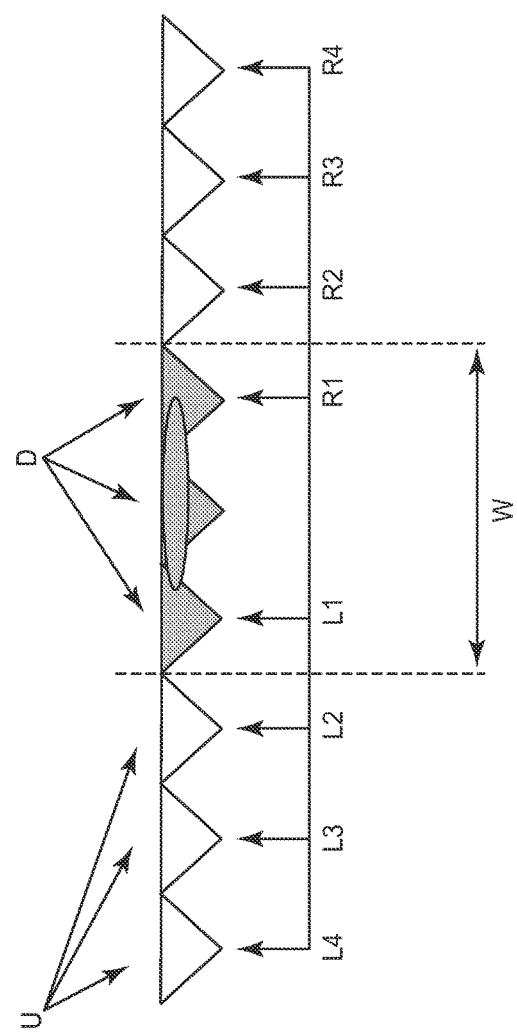
FIG. 1 is a schematic view of a sample of retroreflective sheeting and measurement of the width of its optically degraded area.

The present invention provides a tool for making retroreflective articles such as, for example, retroreflective sheeting. As used herein, the term "retroreflective" refers to the attribute of reflecting an obliquely incident light ray in a direction antiparallel to its incident direction, or nearly so, such that it returns to the light source or the immediate vicinity thereof. The tool has a molding surface that is a patterned surface, which typically has a plurality of indentations. The patterned surface of the tool is itself retroreflective.

The patterned surface comprises a three dimensional array of microstructured retroreflective elements. Suitable retroreflective elements may be cube corner elements. Each cube corner element comprises three approximately mutually perpendicular optical faces. For example, the retroreflective elements may be three sided pyramids having one cube corner each and a triangular base. In another example, the retroreflective elements may have a pentagonal base with two quadrilateral sides, one pentagonal side, and two triangular sides. Illustrative examples these or other cube corner elements are described, for example, in U.S. Pat. No. 1,591,572 (Stimson); U.S. Pat. No. 4,588,258 (Hoopman); U.S. Pat. No. 4,775,219 (Appledorn et al.); U.S. Pat. No. 4,938,563 (Nelson et al.); U.S. Pat. No. 5,138,488 (Szczech); U.S. Pat. No. 5,557,836 (Smith et al.); and U.S. Pat. No. 7,156,527 (Smith); and in U.S. Patent Application Publication No. 2009/0255817 (Lu).

Each indentation in the tool has a depth that corresponds to the resultant retroreflective element height. As examples, each indentation can have a depth (and therefore yield reflective elements of a height) of 0.06 mm, 0.09 mm and 0.18 mm. However, those skilled in the art will readily appreciate that the indentations in the tooling may have any shape and a given tooling may include a variety of indentation shapes and sizes. Those skilled in the art will also readily appreciate that protrusions may be used in place of or in addition to indentations.

A tooling for replication of reflective elements is typically formed on a substantially flat plane from a substrate material that is suitable for a direct machining technique. Preferred materials are those that machine cleanly without burr formation, exhibit low ductility and low graininess, and maintain dimensional accuracy after surface formation. Metals are a useful substrate material because they can be formed in desired shapes and provide excellent optical surfaces to maximize retroreflective performance of a given reflective element configuration. Suitable metals include, for example, aluminum, brass, copper, nickel and the like.

The tools of the invention typically have thicknesses ranging from about 200 μm to about 500 μm. In some embodiments the tools are about 400 μm thick.

The array of retroreflective elements can be made using techniques know in the art. For example, direct machining techniques, also known generally as "ruling" can be utilized. Direct machining comprises cutting away portions of a substrate (for example, a metal plate) to create a pattern of indentations or grooves that intersect to form structures which form the resultant reflective elements, including cube corner elements. In one well known technique, three sets of parallel grooves intersect each other at 60 degree included angles to form an array of cube corner elements, each having an equilateral base triangle (see, for example, U.S. Pat. No. 3,712,706 (Stamm)). In another technique, two sets of grooves intersect each other at an angle greater than 60 degrees and a third set of grooves intersects each of the other two sets at an angle less than 60 degrees to form an array of canted cube corner element matched pairs (see, for example, U.S. Pat. No. 4,588,258 (Hoopman)).

Laminae assembly can also be used. Tools manufactured by laminae assembly are made by assembling together individual lamina or blades which each have a side portion shaped with features of cube corner reflective elements (see, for example, U.S. Pat. No. 7,156,527 (Smith)).

The array of retroreflective elements can also be made using pin bundling techniques wherein a plurality of pins, each having a geometric shape such as a cube corner element on one end, are assembled together to form a master mold. Pin bundling is described, for example, in U.S. Pat. No. 1,591,572 (Stimson) and U.S. Pat. No. 3,926,402 (Heenan), and in U.S. Patent Application Publication No. 2009/0255817 (Lu).

Typically, the tool contains multiple patterned tiles or tooling elements that are joined together, although in some applications the opposite ends of a single tooling element are brought together and joined to form a substantially cylindrical shape. When multiple tooling elements are utilized, the first tooling element (the master) is usually created as described above by direct machining and then multiple copies are made using techniques known in the art such as through electroplating. Electroplating is described, for example, in U.S. Pat. No. 4,478,769 (Pricone) U.S. Pat. No. 5,156,863 (Pricone) and U.S. Pat. No. 6,159,407 (Krinke). The resulting copies, which are discrete elements, can then be joined together. When the composite tooling is of a desired size, it is typically coiled into the form of a cylinder, belt or sleeve.

When tooling elements are welded together, the resulting weld lines or seams that are formed on the patterned surface of the tool produces a welding seam in the resultant mold or article, such as retroreflective sheeting, replicated therefrom. In retroreflective sheeting produced by such a tooling, the seam can be more visible than is desired in daylight and retroreflected light. The textured surface of the seam causes scattering of the reflected light and makes the seam visible. This can especially be the case in retroreflective sheeting made from a tooling that has a metal coating thereon. Moreover, the flowable resin tends to adhere to the weld line to form defects in the finished retroreflective sheeting. Additionally, physical distortions (caused by heating and re-cooling) in the retroreflective elements adjacent to a weld seam can degrade their retroreflective performance.

In the present invention, tooling elements (or the opposite ends of a single tooling element) are joined using a single spatial mode continuous wave laser welding process. As used herein, the terms "single mode" or "single spatial mode" mean a substantially single spatial mode operation, resulting in a Gaussian cross sectional intensity profile. It is to be understood that the single mode operation allows for slight deviations from the Gaussian cross sectional intensity profile. As used herein, the term "continuous wave" or "CW" refers to a laser which continuously generates light (as compared to a pulsed laser) and is intended to include quasi-continuous wave modes of operation.

Suitable lasers for use in the method of the invention include, for example, fiber lasers and disk lasers.

Fiber lasers are lasers in which the active gain medium is an optical fiber doped with rare-earth elements such as, for example, ytterbium, erbium, neodymium, dysprosium, praseodymium, or thulium. Fiber lasers can generate very intense laser beams with an almost theoretical beam quality which provides excellent focusing properties. The highly intense and tightly focused fiber laser beams melt a very small area of the substrate material and may generate deep penetration welds at high processing speeds. The high processing speeds and limited molten spot diameter produce less heat than conventional lasers at the weld point and in the adjacent areas. Thus continuous wave and high beam quality (single mode) fiber laser welding can provide an extremely narrow welding seam and also minimize physical distortions in the retroreflective elements adjacent to the welding seam. The region of diminished optical performance adjacent the welding seams on retroreflective articles replicated from tools of the invention is therefore much smaller than in retroreflective articles replicated from tools of the prior art. Accordingly, the welding seams on retroreflective articles replicated from tools of the invention are also less conspicuous.

In some embodiments of the present invention, the optically degraded area adjacent the welding seam on the patterned surface of the tool or the corresponding welding seam that has been replicated onto the pattered surface of a retroreflective article replicated therefrom has a width of about 400 µm or less, about 300 µm or less, about 200 µm or less, about 100 µm or less, about 70 µm or less, or about 50 µm or less. In other embodiments, the optically degraded area adjacent the welding seam on the patterned surface of the tool or replicated article has a width between about 50 µm and about 400 µm, or between about 70 µm and about 300 µm. In some embodiments of the present invention, the welding speeds of 40 mm/s or more, 100 mm/s or more, or even 150 mm/s or more can be utilized. Typically, for example, the welding speed for the methods of the invention varies between about 40 mm/s and about 150 mm/s.

Despite the narrowness of the weld seams produced using the method of the invention, the welds provided are sufficiently strong for their intended application (for example, the tensile strength is greater than about 50 kpsi). In some embodiments, the welds are as strong as or even stronger than conventional welds. Strength of a material is usually defined as its ability to withstand an applied stress. Different types of stresses can be applied to materials and they cause certain deformations. One way of characterizing the strength of a material is by determining its tensile strength, which is the maximum applied stress during stretching that the material can handle without failure. This type of strength test is commonly used to characterize the strength of welded seams. The welded seams of tools of the invention can, in some embodiments, have at least 15% higher tensile strength than tools of the prior art welded using conventional welding processes. This may be due to effects of rapid cooling of the fusion zone from the fiber laser welding process affecting resultant phase and grain size, with smaller grains producing strengthened interfaces.

Commercially available fiber lasers operating at, for example, wavelengths around 1 µm may be utilized in the method of the invention. Preferred fiber lasers are doped with ytterbium and operate with a wavelength of 1.07 µm. One suitable commercially available fiber laser is the SP-400C model from SPI Lasers, UK. Other suitable fiber lasers include, but are not limited to, single mode fiber lasers from IPG Photonics and GSI Group. Such suitable lasers deliver light energy with an integrated single mode external optical fiber which ends with a beam delivery optics. The laser beam from the beam delivery optics can be directed to the welding head with a mirror. Suitable commercial available welding heads can be obtained, for example, from Laser Mechanisms, Novi, Mich. After being reflected toward the material to be welded by a dichroic mirror, the laser beam can be focused by a focusing lens. Charge-coupled device (CCD) cameras can be used to allow the operator to precisely navigate around the edges of the tooling.

Key variables in the welding process include the beam size, the focal length, the welding speed and the power. These variables can be used to determine the spot size of the focused laser beam and the percent penetration of weld. Conventional solid state laser welding systems typically use large core multi mode external beam delivery fibers with 1:1 or larger magnification imaging optics, which usually limit the focal spot size to hundreds of microns. Welding with large focal spots is typically performed with pulsed lasers to generally produce conduction mode welds. This type of welding relies on the conductivity of the material being processed and leads to shallow welded joins with substantial heat affected areas. Thus, for narrow seam and deep penetration welds with limited heat affected areas, single mode or low-order mode CW lasers are used in the methods of the invention. The laser beam power can be set, for example in ranges between about 40 W and about 200 W.

Although other types of lasers such as, for example, disk lasers can also be used in the method of the invention to provide for narrow seam size welding, fiber lasers can provide advantages such as high power, excellent power stability, high beam quality, high wall plug efficiency and relatively low price.

Limited welded seam size, low melt volume and high processing speeds achievable with CW single mode lasers significantly reduce the amount of heat compared to traditional welding techniques and thus limit the heat affected area. This makes the aforementioned technique particularly suitable for joining retroreflective microstructured tools. The tools of the invention (and their replicas) thus have narrow seam lines with deep penetration.

Typically, the tools of the invention are welded from the backside. In some embodiments, the welding variables are set so as to not achieve 100% penetration of the tooling thickness when welding from the backside. One hundred percent penetration is seen as blisters or bubbles of molten material that emerge or erupt from the patterned side of the tool in or near the weld line. In some embodiments, the maximum penetration is about 85%, about 90% or about 95%. When there is less than 100% penetration from the backside, the front side (i.e., the patterned side) may be welded to seal the gap. This is typically done at a lower power setting.

The tools of the invention can be used to make retroreflective articles such as retroreflective sheeting. As used herein, "sheeting" refers to a thin piece of polymeric material upon which microstructured retroreflective elements have been formed. The sheeting may be of any width and length, such dimensions only being limited by the equipment (for example, width of the roll, width of the slot die orifice, etc.) from which the sheeting was made.

Manufacture of the sheeting is typically achieved by casting a fluid resin composition onto the tool and allowing the composition to harden to form a sheet. One method for casting fluid resin onto the tool is described, for example, in U.S. Pat. No. 7,410,604 (Erickson et al.). Optionally, however, the tool can be employed as an embossing tool to form retroreflective articles such as described in U.S. Pat. No. 4,601,861 (Pricone).

Suitable resin compositions for retroreflective sheeting are preferably transparent materials that are dimensionally stable, durable, weatherable and readily formable into the desired configuration. Examples of suitable materials include acrylics, which have an index of refraction of about 1.5 such as Plexiglas™ resin manufactured by Rohm and Haas Company; polycarbonates, which have an index of refraction of about 1.59; reactive materials such as thermoset acrylates and epoxy acrylates; polyethylene based ionomers such as those marketed under the name SURLYN by E.I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers or other additives.

A specular reflective coating such as a metallic coating can be placed on the backside of the retroreflective elements. In addition or in lieu of a metallic coating, a seal film can be applied to the backside of the retroreflective elements. The seal film maintains an air interface at the backside that enables total internal reflection and inhibits the entry of contaminants such as solid and/or moisture. Further, a separate overlay film may be utilized on the viewing surface of the sheeting for improved durability or to provide an image receptive surface.

An adhesive layer can also be disposed behind the retroreflective elements to enable the sheeting to be secured to a substrate. Suitable substrates include wood, aluminum sheeting, galvanized steel, polymeric materials and laminates made from these and other materials.

EXAMPLES

Objects and advantages of this invention are further illustrated by the following examples, but the particular materials and amounts thereof recited in these examples, as well as other conditions and details, should not be construed to unduly limit this invention. All parts and percentages are by weight unless otherwise indicated. In the Examples, N/M may be used to report properties that were not measured.

Test Methods

Tensile strength: tensile strength of welds of 3 samples of a molding tool prepared as generally described below in Molding Tools 1, 2 and 3 was measured using an Instron testing machine (model "1123", obtained from Instron, Norwood, Mass.). The testing machine was set up for weld testing with a crosshead speed of 0.1 inch/minute (0.25 cm/min). Test samples 0.5 in (1.27 cm) wide and 5 in (12.7 cm) long and 400 µm thick were cut and welded along their width. The back sides (flat major surfaces) of the Molding Tool 1 sample was first welded using a power setting of about 108 W followed by front side welding at a power setting of about 53 W. Welding speeds of 100 mm/s and 80 mm/s were employed respectively. Molding Tool samples 2 and 3 were back side welded only at a speed of 100 mm/s. Power settings of 126 W and 144 W were used respectively. Width, thickness and length were measured for each sample, recorded and then used to determine tensile strength. Each sample was tested to its breaking point and the load at which it happened was recorded as maximum load. Maximum load values were then divided by the cross-sectional areas of the welds to determine tensile strength. The average value of tensile strength for the three samples at maximum load is reported.

Width of optically degraded area: width of optically degraded areas of Comparative Examples A-F and Examples 1-3 was measured using an interferometer (ZYGO® Micro GPI™ operating at 632.8 nm with a 20× objective running Metropro 9.0.10 software) using the following technique: retroreflective film samples were attached to a sample holder with the structured surface facing away from the interferometer. The sample holder had several translation and rotation axes to allow adjustment of the position of the sample. The sample was positioned in the focal plane of the interferometer so that the optical axis of the interferometer was approximately perpendicular to the generally flat surface of the retroreflective film. Zoom was adjusted so that one truncated cube corner in the cube corner array occupied most of the interferometer measurement window. The tilt of the sample with respect to the interferometer optical axis was adjusted so that a minimum number of fringes were visible across the sample. The lateral spatial dimensions of the measurements made by the interferometer were calibrated by reference to known distances between features on the cube corner array at this magnification. A software mask was constructed to only include data captured within the optically-active aperture of the cube corner in the analysis; all data outside of the software mask was excluded from the analysis. The refractive index of the cube corner array material was entered into the software.

The retroreflective film was moved within the focal plane of the interferometer to position the active aperture of the cube corner so that it was aligned with the previously-defined software mask. The interferometer software then calculated the optical path difference (OPD—measured in waves of about 632.8 nm) between a reference plane wave and a plane wave that passed into and out of the cube corner element at the desired measurement location (including the removal of a plane to account for any tilt of the cube corner sample with respect to the interferometer).

The first measurement was made at a first visible cube corner element immediately adjacent to the weld. In some instances, this cube corner element lay within the melted region of the weld, in which case the cube corner element was destroyed (or completely distorted) and did not exhibit retroreflection. In this instance, the interferometric measurement was not needed and the cube corner element was manually assigned an arbitrarily high OPD value to distinguish it from other cube corner elements that were still retroreflective. The interferometer performed three separate measurements and averaged the resulting phase profiles to determine the OPD for the cube corner. The peak-to-valley (P-V) OPD was recorded for this cube corner. The perpendicular distance between the center of the weld and the cube corner peak was also measured, using a calibrated microscope, and recorded.

The retroreflective film sample was translated within the focal plane of the interferometer in a direction perpendicular to the weld so that the cube corner adjacent to the one previously measured was centered within the interferometer measurement window. In some instances, the cube corner elements were canted and the peaks of adjacent cube corner elements did not lie along a line. In this instance, the retroreflective film sample was moved in a direction parallel to the weld to position the adjacent cube corner into the center of the measurement window. This measurement process was repeated for several horizontally adjacent cube corner elements, with each subsequent measurement location farther away from the weld than the previous measurement location, until the measured P-V OPD value did not change significantly from one cube corner element to the next, and the P-V OPD value was also similar to the P-V OPD value measured in a reference cube corner element far removed from the weld. At this point the retroreflective film sample was translated back to the starting position and the measurement process repeated on the opposite side of the weld from where the first measurements were made.

The data set resulting from the above-described procedure was analyzed to determine the average and standard deviation of the measured P-V OPD of the undistorted cube corner elements on one side of the weld. The first undistorted cube corner element on each side of the weld was defined to be the corner cube having a P-V OPD defined by:

$$(P\text{-}V\ OPD)_{good} \leq (P\text{-}V\ OPD)_{avg} + 3*\sigma \quad \text{(Equation 1)},$$

wherein $(P\text{-}V\ OPD)_{avg}$ is the average P-V OPD and $\sigma$ is the standard deviation.

Optically degraded area, as used in these examples, means an area of the retroreflective sheeting in which the measured P-V OPD is larger than the value computed in Equation 1. As depicted in FIG. 1, the upward pointing arrows (labeled as L4, L3 . . . R3, R4) show the measurement locations, W is the calculated width of the optically degraded area, U shows undistorted cube corner elements, and D shows distorted cube corner elements. The width of the optically degraded area is defined to be the distance (measured perpendicular to the weld) between the transitions of the optically degraded area and the optically-functional area on either side of the weld. The transition between the optically degraded area and the optically-functional area of the retroreflective film was defined as the location halfway between the first undistorted cube corner element U and the last distorted cube corner element D. For example, in FIG. 1, the transition on the left side is between L2 and L1, and the transition on the right side is between R1 and R2.

Materials

| | |
|---|---|
| BAED | bisphenol-A epoxy diacrylate obtained from Cytec Industries Inc., Smyrna, GA, under the trade designation "EBECRYL 3720". |
| DMAEA | Dimethylaminoethyl acrylate, obtained from Cytec Industries Inc. |
| EAA | Ethylene acid acrylate, obtained from Dow Company, Midland, MI, under the trade designation "PRIMACOR 3340". |
| HDDA | 1,6-hexanediol diacrylate, obtained from Cytec Industries Inc. |
| HMP/TPO | Blend of 2-hydroxy-2-methyl-1-phenyl propan-1-one and 2,4,6-trimethyl-benzoyldiphenylphosphine oxide (TPO), obtained from BASF Corporation, Florham Park, NJ, under the trade designation "DAROCUR 4265" |
| TMPTA | Trimethylolpropane triacrylate, obtained from Cytec Industries Inc. |
| TPO | (2,4,6 trimethylbenzoyl) diphenylphosphine oxide, a photoinitiator, obtained from Sigma-Aldrich, St. Louis, MO. |

Laser Setup

Figure 2:
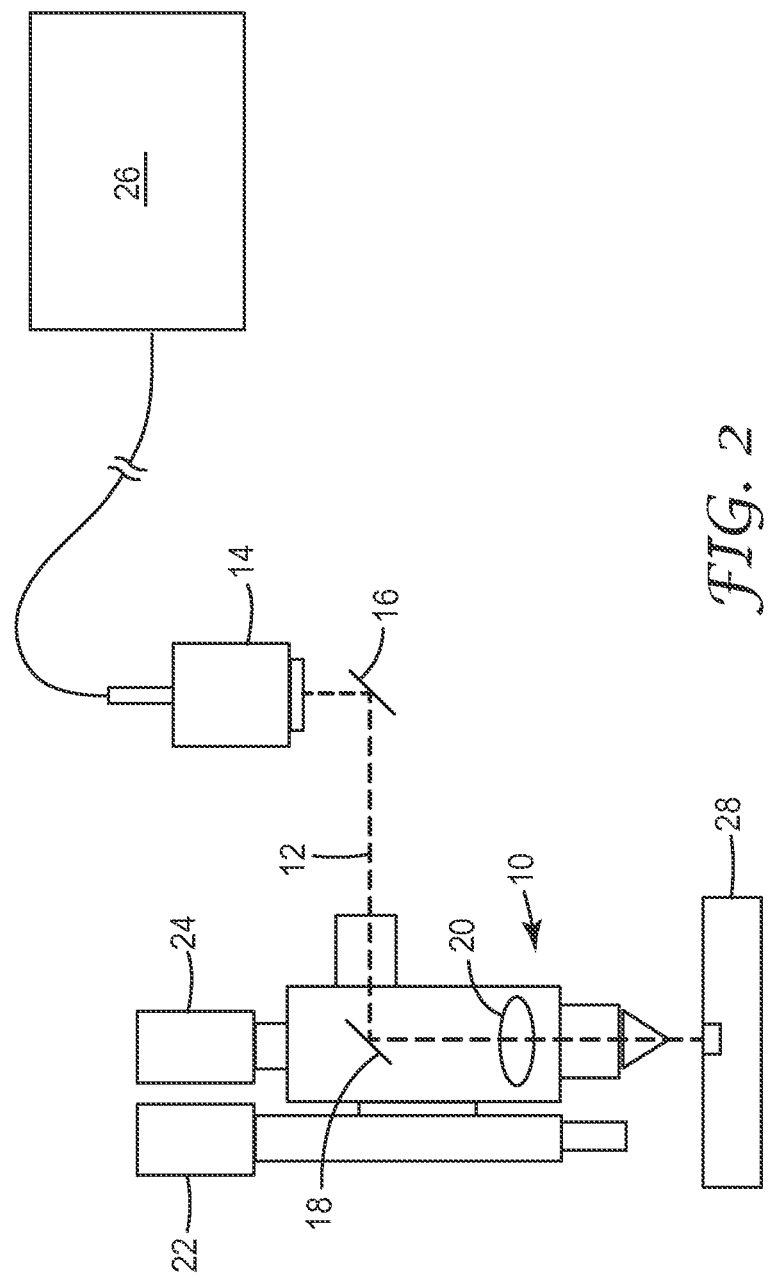
FIG. 2 is an experimental laser setup.
Figure 3:
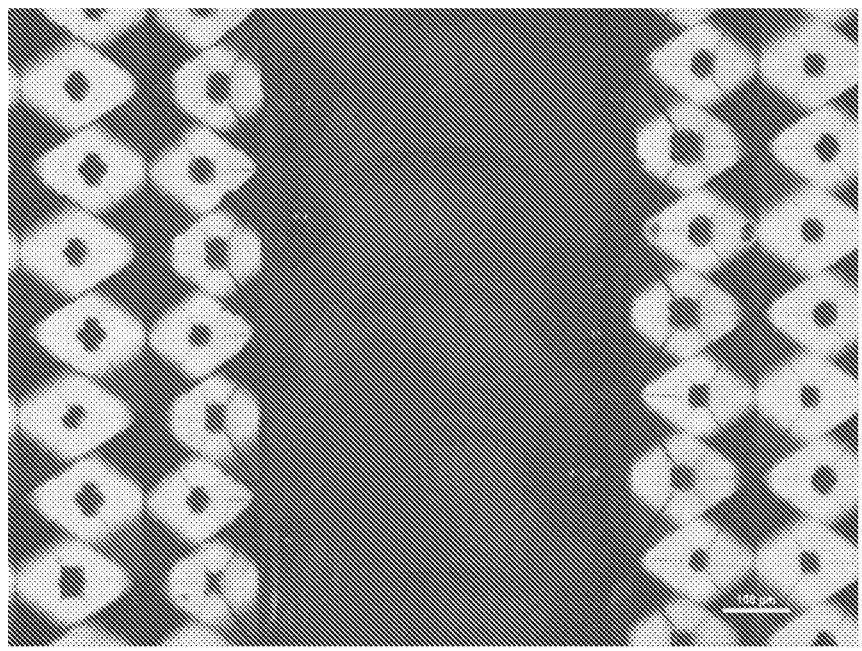
FIG. 3 is a digital picture of the welding seam of Comparative Example A.
Figure 4:
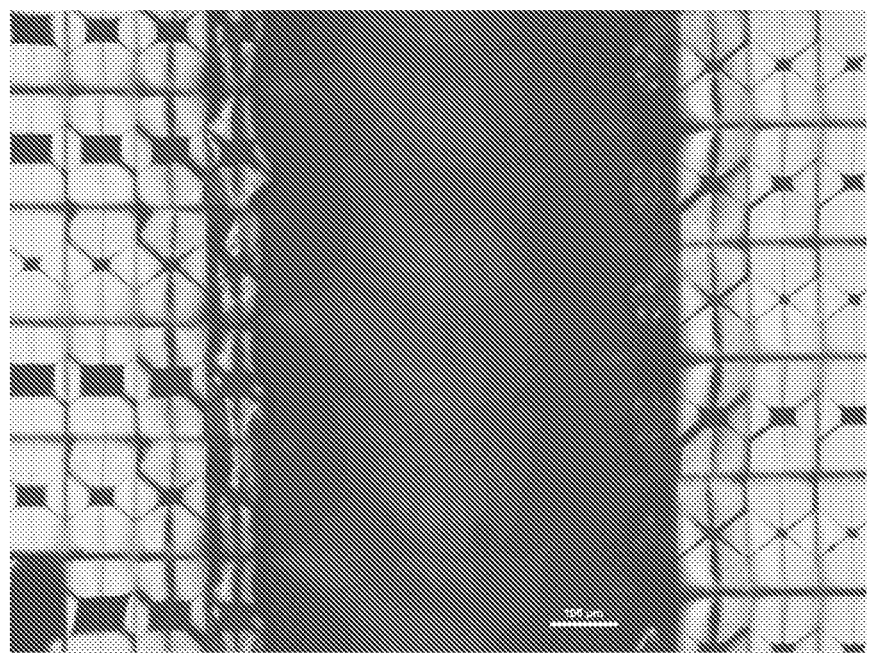
FIG. 4 is a digital picture of the welding seam of Comparative Example B.
Figure 5:
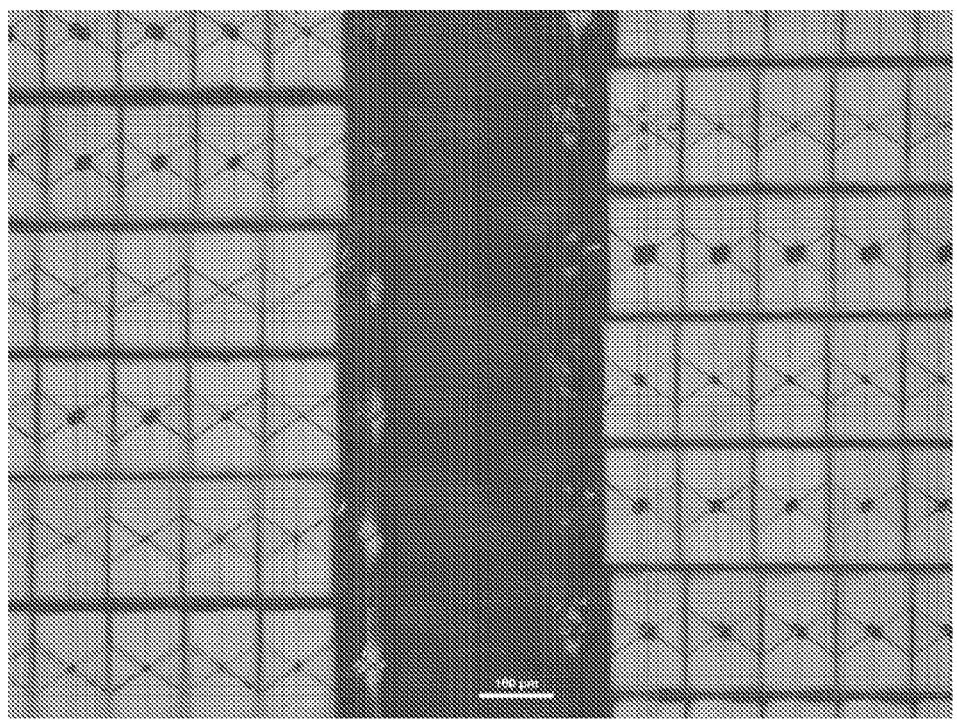
FIG. 5 is a digital picture of the welding seam of Comparative Example C.
Figure 6:
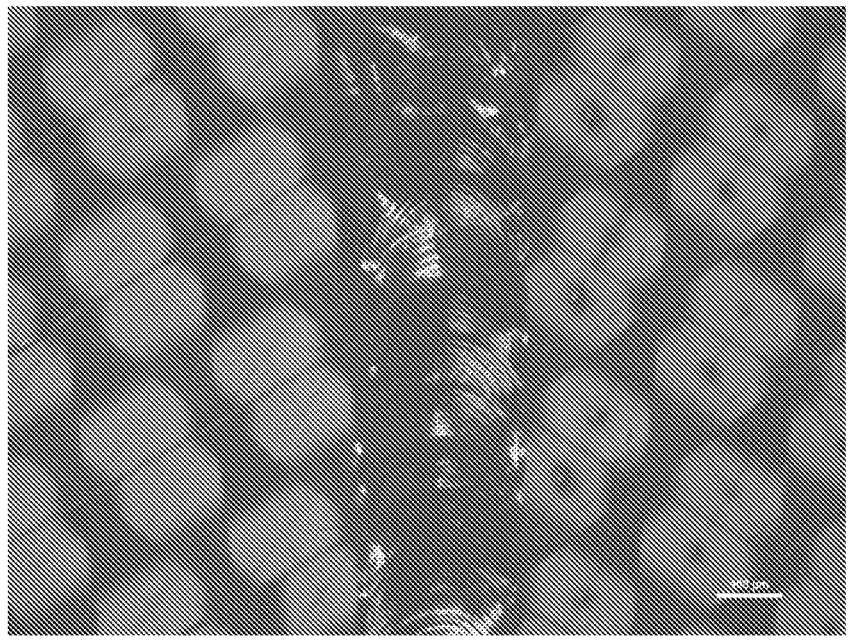
FIG. 6 is a digital picture of the welding seam of Comparative Example D.
Figure 7:
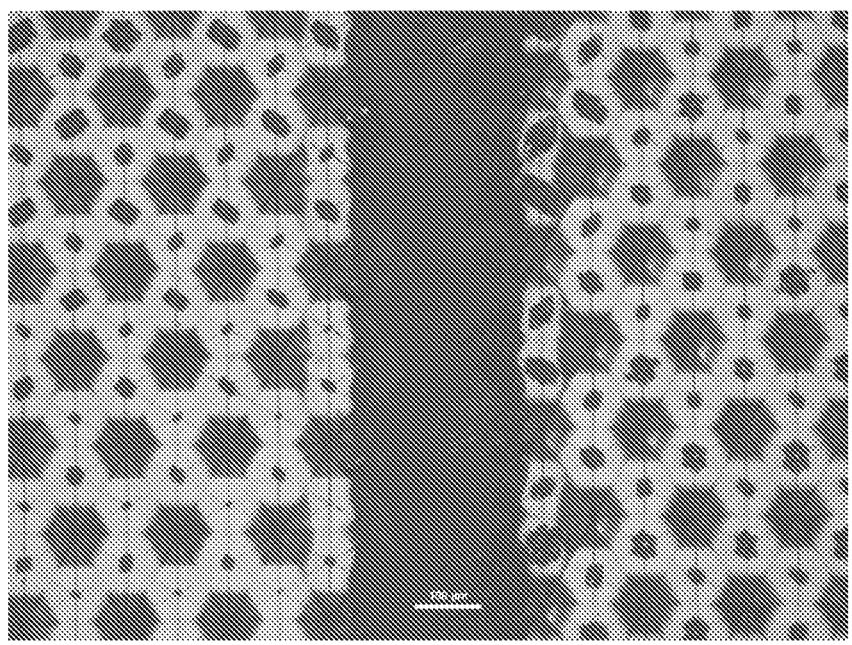
FIG. 7 is a digital picture of the welding seam of Comparative Example E.
Figure 8:
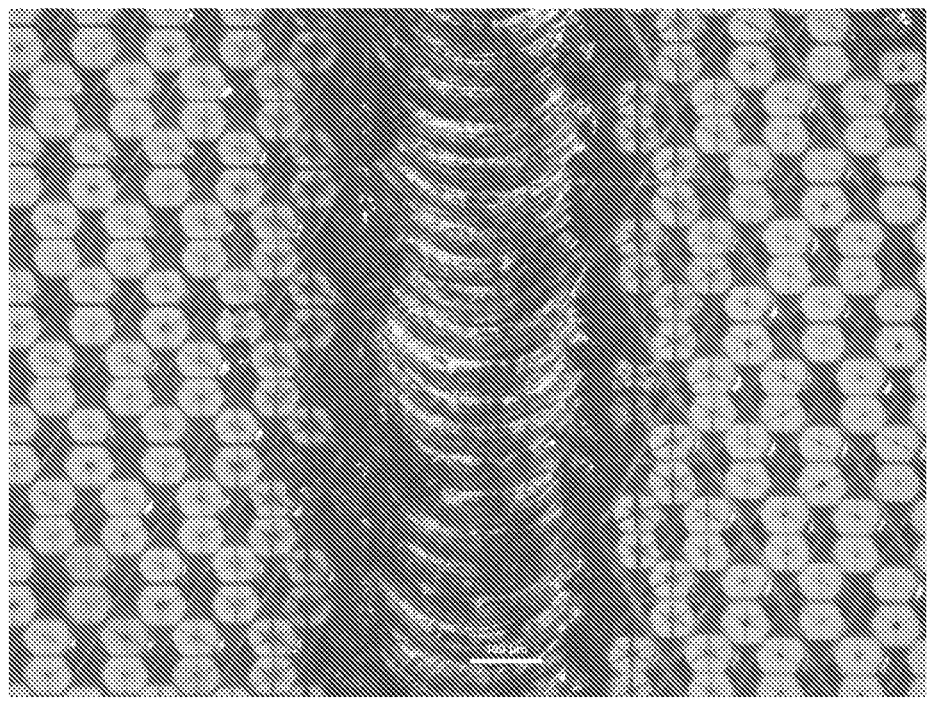
FIG. 8 is a digital picture of the welding seam of Comparative Example F.

The experimental setup is presented in FIG. 2. A 400 W continuous wave fiber laser 26 (model "SP-400C", obtained from SPI Lasers, UK) operating at a wavelength of 1070 nm was used. An intense and high quality beam with an "M squared" ($M^2$) parameter of about 1.05 was generated by the laser. The fiber laser was protected from back reflection with a Faraday isolator 14 mounted at the end of the delivery beam fiber. The output beam diameter was approximately 5.2 mm.

The beam was directed to a commercially available welding head 10 (model "YAG DEL HEAD BASE UNIT"

and "YAG DEL HEAD WELDER", obtained from Laser Mechanisms Inc., Novi, Mich.) with a dielectric mirror 16. After being reflected down by a dichroic mirror 18 the beam 12 was focused by a focusing lens 20 having a focal length of f=100 mm. The focal spot position was kept on the top surface of the welded materials. Nitrogen or argon was used as the welding assist gas.

Nickel samples were mounted on the top of a strong magnet, which held them together during the welding process. A copper strip was permanently inserted into the center of the magnet 28, where the welded joints were formed, to protect the magnet so that its surface would not be melted within the power range used in the experiments. The strip also helped to keep the welded pieces cool.

The samples were ground flat to the same uniform thickness. The edges were then precision diamond machined. The parallel machined edges were butted together on the magnet and steel bars were placed on top of the samples to hold them flat.

Two CCD cameras, one mounted on the front side of the head 22 and the second 24 mounted above the dichroic mirror 18 allowed the operator to navigate around the edges of toolings in a precise manner. The welding system (i.e., the welding head, cameras and the Faraday isolator) was mounted on XYZ precision gantry stages, which enabled accurate motion during the welding process.

Preparation of Comparative Molding Tool and Molding Tools 1-7

A master was prepared essentially as described in U.S. Pat. No. 6,843,571 (Sewall). Three groove sets, which formed truncated cube-corner structures having a height of approximately 50 microns (1.95 mils), were cut onto a machinable metal using a high precision diamond tool such as "K&Y Diamond," manufactured and sold by Mooers of New York, U.S.A. The resulting cube-corner structures had three sets of intersecting grooves with a pitch of 4 mils (102 micrometers). The intersecting grooves formed a cube-corner base triangle with included angles of 58°, such as generally described in U.S. Pat. No. 5,138,488 (Szczech).

The master was removed from the groove-forming machine. A first generation negative tooling was made from the master by nickel electroforming the master in a nickel sulfamate bath as generally described in U.S. Pat. No. 4,478,769 (Pricone) and U.S. Pat. No. 5,156,863 (Pricone). Additional multigenerational positive and negative copies were formed such that the tooling had substantially the same degree of precise cube formation as the master. Each tooling had a generally flat major surface (i.e., backside) and a structured major surface (i.e., front side), opposite the flat major surface. The structured surface contained cube-corner projections or cube-corner recesses (cavities).

Multiple second generation negative toolings containing cube-corner recesses were subsequently turned into an endless belt, as generally described in U.S. Pat. No. 7,410,604 (Erickson).

Comparative Molding Tool was backside welded using a conventional laser (model "JK702H", obtained from GSI Lumonics, Bedford, Mass.) as generally described in U.S. Pat. No. 6,322,652 (Paulson).

Molding tools 1-7 were welded using the fiber laser and laser setup described above, using different process parameters and varying the location of the weld. In Molding Tools 2-6, a backside weld (i.e., the toolings were welded from their generally flat major surface) was provided. In Molding Tools 1 and 7, backside and front side welds were provided. In Molding Tools 1 and 7, approximately 85% penetration was generated from the backside to provide mechanical strength and the front side was welded with approximately 53W to seal the gap.

Process conditions and location of the weld used in the preparation of Comparative Molding Tool and Molding tools 1-7 are shown in Table 1, below.

TABLE 1

| Molding tool | Laser | Location of the weld | Focal length (mm) | Welding speed (mm/s) | Power (W) |
|---|---|---|---|---|---|
| Comp. Molding Tool | Nd: YAG/ Pulsed | Backside | 90 | 10.6 | 290 |
| Molding tool 1 | Fiber laser/ CW | Backside/ Front side | 100 | 100/80 | 108/53 |
| Molding tool 2 | Fiber laser/ CW | Backside | 100 | 100 | 126 |
| Molding tool 3 | Fiber laser/ CW | Backside | 100 | 100 | 144 |
| Molding Tool 4 | Fiber laser/ CW | Backside | 100 | 80 | 72 |
| Molding Tool 5 | Fiber laser/ CW | Backside | 100 | 60 | 72 |
| Molding Tool 6 | Fiber laser/ CW | Backside | 100 | 40 | 53 |
| Molding Tool 7 | Fiber laser/ CW | Backside/ Front side | 100 | 80/80 | 53/53 |

Tensile strength of the welds provided on Comparative Molding Tool and Molding Tools 1-3 were measured as described above. Results are reported in Table 2, below.

TABLE 2

| Molding tool | Tensile strength (kpsi) |
|---|---|
| Comparative Molding Tool | 55 |
| Molding tool 1 | 64 |
| Molding tool 2 | 67 |
| Molding tool 3 | 74 |

EXAMPLES

Comparative Examples A-F

Commercially available retroreflective sheetings, as shown in Table 3, below, were obtained and are hereinafter referred to as Comparative Examples A-F.

TABLE 3

| Comp. Examples | Color | Trade Designation | Supplier |
|---|---|---|---|
| Comp. Example A | White | HIGH INTENSITY PRISMATIC SERIES 3930 | 3M Company, St. Paul, MN |
| Comp. Example B | White | DIAMOND GRADE DG[3] SERIES 4000 | 3M Company |
| Comp. Example C | White | OMNICUBE T-11500 PRISMATIC REFLECTIVE FILM | Avery Dennison Corp., Pasadena, |

TABLE 3-continued

| Comp. Examples | Color | Trade Designation | Supplier |
|---|---|---|---|
| Comp. Example D | Orange | WR-6104 WORK ZONE REBOUNDABLE HIGH INTENSITY SHEETING | Avery Dennison Corporation |
| Comp. Example E | White | T-9500 OMNI VIEW SERIES | Avery Dennison Corporation |
| Comp. Example F | White | VC104+ RIGID GRADE REFLECTIVE MARKING TAPE | Reflexite Corporation, Avon, CT |

Digital pictures of the welds of Comparative Examples A-F were taken using a Nikon MM-11C compound microscope with 10× objective lens, and are shown, respectively, on FIGS. 3-8.

Examples 1-3

Figure 9:
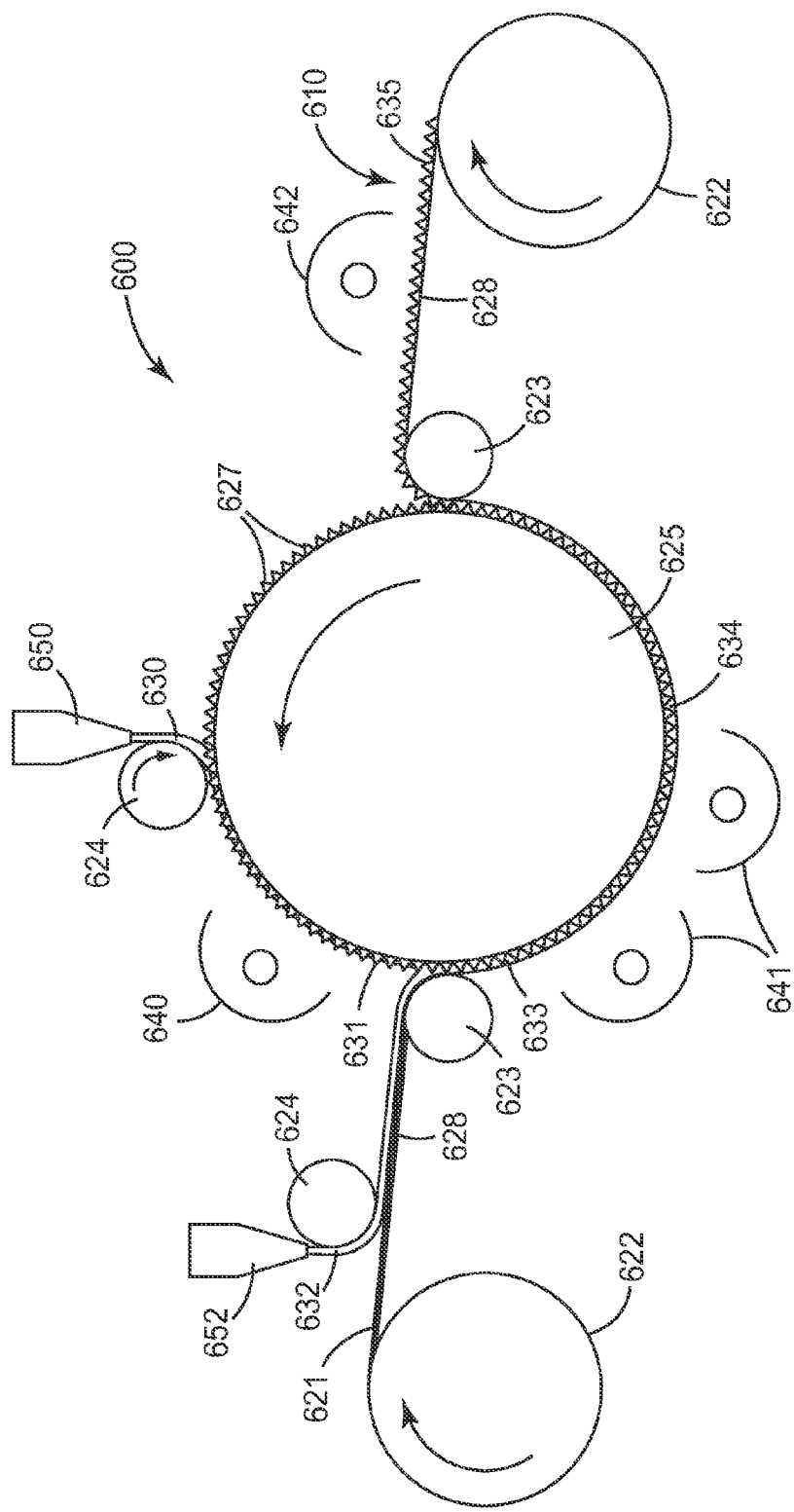
FIG. 9 is a schematic view of a process used to make retroreflective sheeting as described in Examples 1-3.

The following description for the preparation of Examples 1-3 refers to apparatus 600 as generally shown in FIG. 9. An overlay film 621 was made by extruding an EAA film at a thickness of 0.01 cm (4 mil) onto a corona treated polyethylene terephthalate (PET) carrier film 628. Pellets of EAA were fed into a 1.9 cm (0.75 in.) single screw extruder (obtained from C.W. Brabender Instruments Inc., South Hackensack, N.J.) with temperatures set at 140° C. (284° F.) for zone 1 and ramped up to 175° C. (347° F.) at the extruder exit and die, resulting in a melt temperature of about 175° C. (347° F.). As the molten resin exited the extruder, it passed through a conventional horizontal film die (obtained from Extrusion Dies Industries LLC, Chippewa Falls, Wis., under the trade designation "ULTRAFLEX-40") and was cast onto the PET carrier film 628. The PET carrier film 628 was traveling at about 36 meters/min (120 ft/min). The resulting molten overlay film 621 on the PET carrier film 628 was run between a rubber roll/chilled steel roll nip to solidify the molten resin into a layer. The EAA surface was corona treated at an energy level of about 1.0 J/cm2.

A radiation-curable resin was prepared by combining 25 wt. % BAED, 12 wt. % DMAEA, 38 wt. % TMPTA, 25 wt. % HDDA, and 0.5 pph (parts per hundred) TPO. A first portion of the resin 630 was extruded and passed through a first die 650 which was brought into close proximity to a first rubber roll 624. The rubber roll 624 ran in a clockwise motion and nipped against a molding tool 625 heated to 180° F. (82° C.) containing a plurality of cube-corner cavities 627. The molding tool 625 was mounted on a mandrel rotating in a counterclockwise motion at about 75 fpm (22.8 m/min). The radiation-curable resin 630 partially filled the cube-corner. The overlay film 621 was drawn along from a supply roll 622 with the EAA side facing upward. A second portion of the radiation-curable resin 632 was simultaneously cast through a second die 652 onto a second rubber roll 624. The second rubber roll 624 contacted the EAA side of the overlay film 621, transferring the second portion of the radiation-curable resin 632 onto the overlay film. The coated overlay film was brought in contact with the molding tool 625 containing the partially filled, pre-cured cube-corner structures 631 via a third silicone-coated rubber roll 623. The resin coated on the overlay film completely filled the unfilled portion of the cube-corner cavities, and the composite construction was cured through the overlay film 621 to form a retroreflective film article 634, using two Fusion "D" lamps 641 (Fusion Systems) set at 600 W/in., and also using dichroic filters (not shown) in front of the UV lamps. The retroreflective film 634 was separated from the molding tool 625 and then irradiated by a Fusion "D" UV lamp 642 operating at 100% to provide a post-UV irradiation cure through the composite cube-corner structures 635. The retroreflective film 634 was then passed through an oven set at 127° C. (260° F.). Molding Tools 1-3 were used in the preparation of, respectively, retroreflective films of Examples 1-3. The resulting cube-corner structures had three sets of intersecting grooves with a pitch of 4 mils (102 micrometers). The intersecting grooves formed a cube-corner base triangle with included angles of 58° and a cube-corner element height of 1.95 mil (50 micrometers). The primary groove spacing is defined as the groove spacing between the grooves which form the two 58° base angles of the base triangle.

Figure 10:
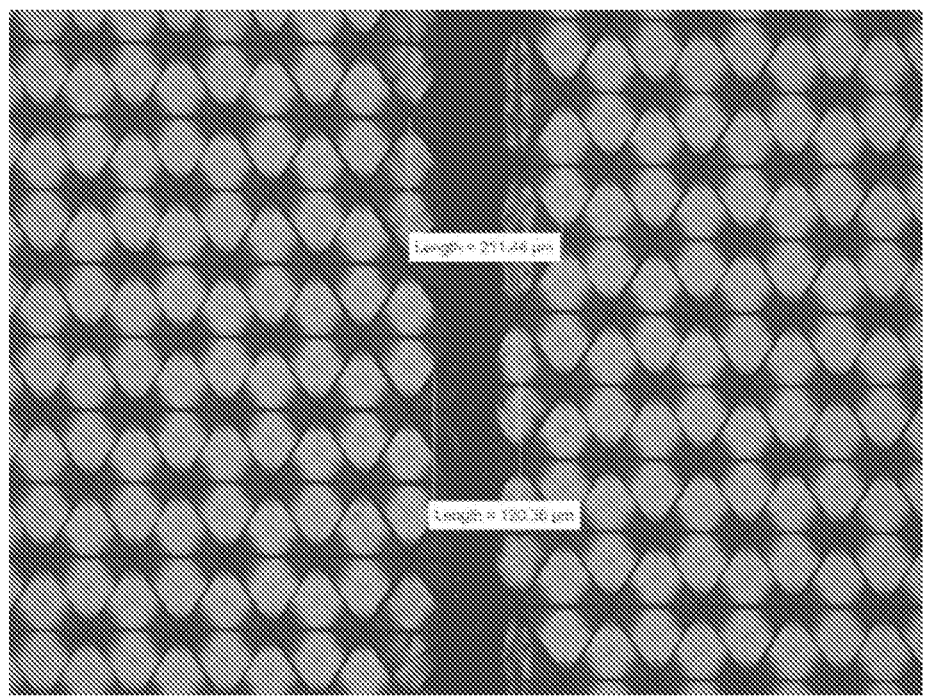
FIG. 10 is a digital picture of the weld of Example 1.
Figure 11:
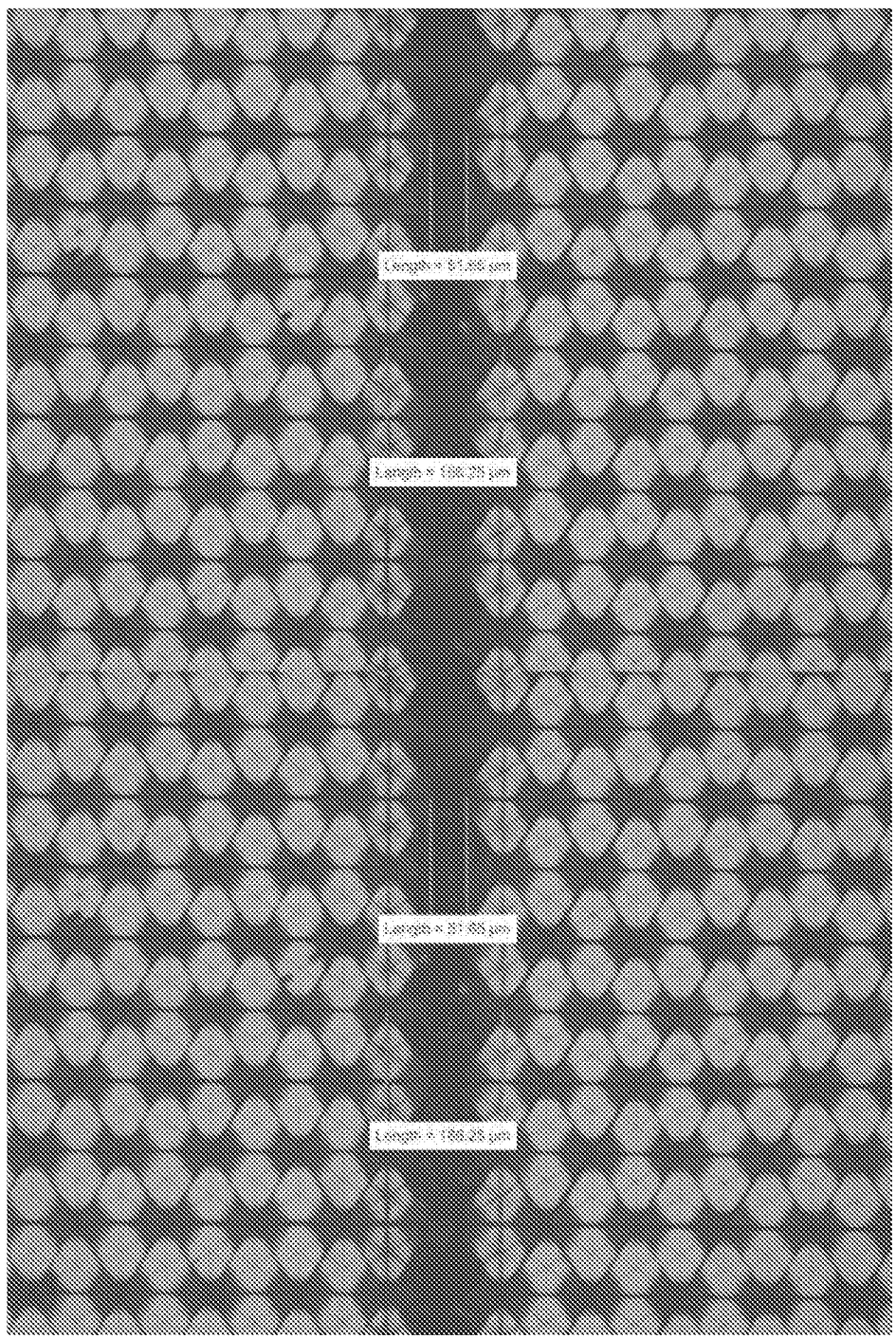
FIG. 11 is a digital picture of the weld of Example 2.
Figure 12:
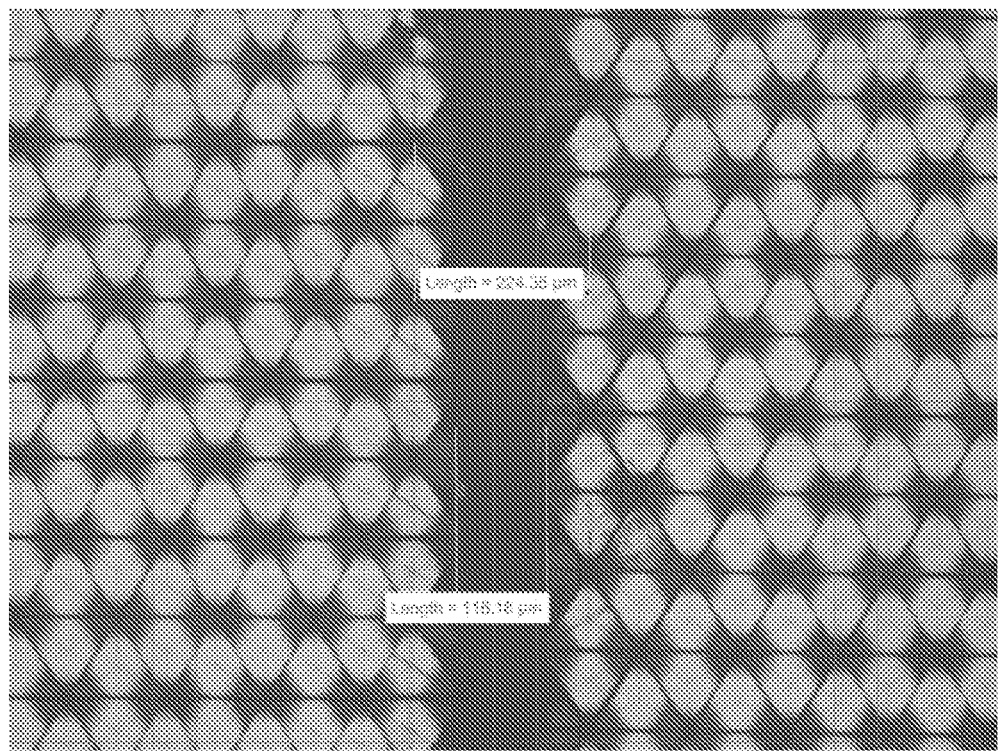
FIG. 12 is a digital picture of the weld of Example 3.

Digital pictures of welds of Examples 1-3 were taken using a Nikon MM-11C compound microscope with 10× objective lens, and are shown, respectively, on FIGS. 10-12.

Figure 13:
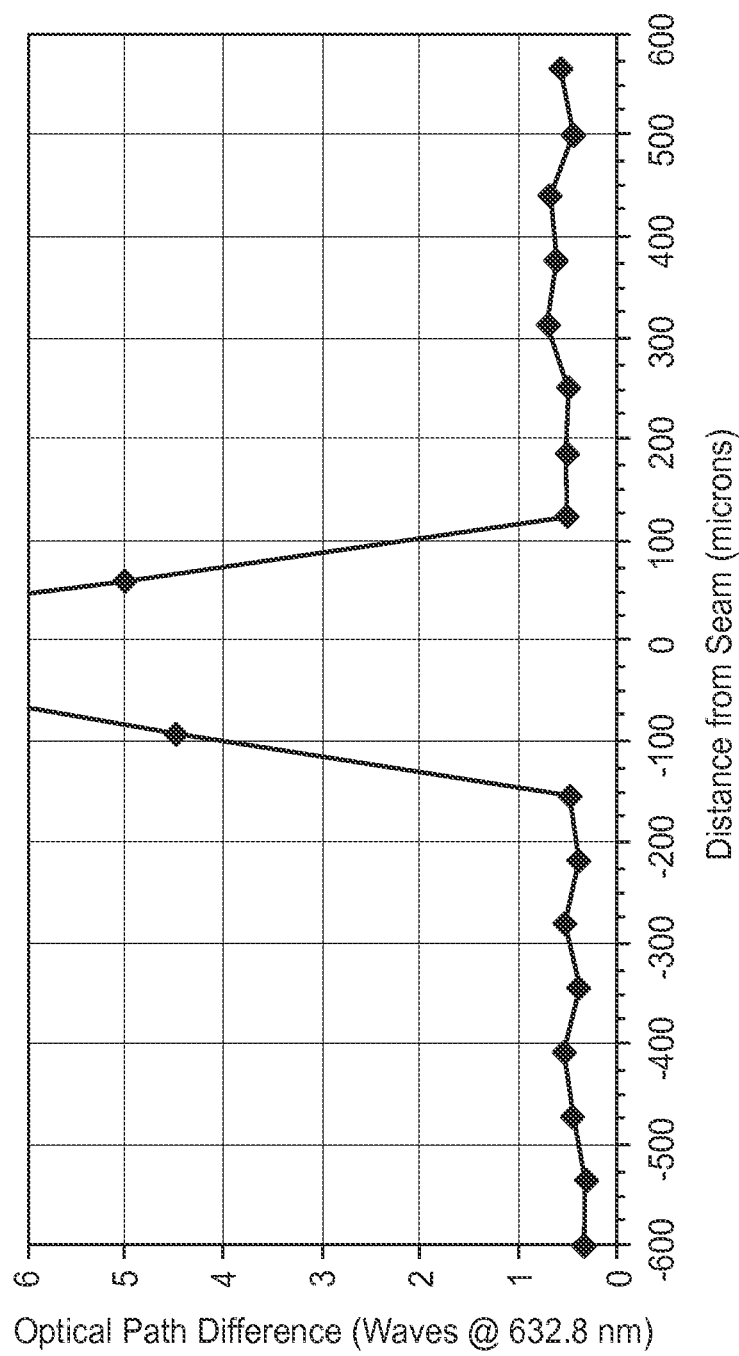
FIG. 13 is a representative data set for calculation of the optically degraded area of Example 1.
Figure 14:
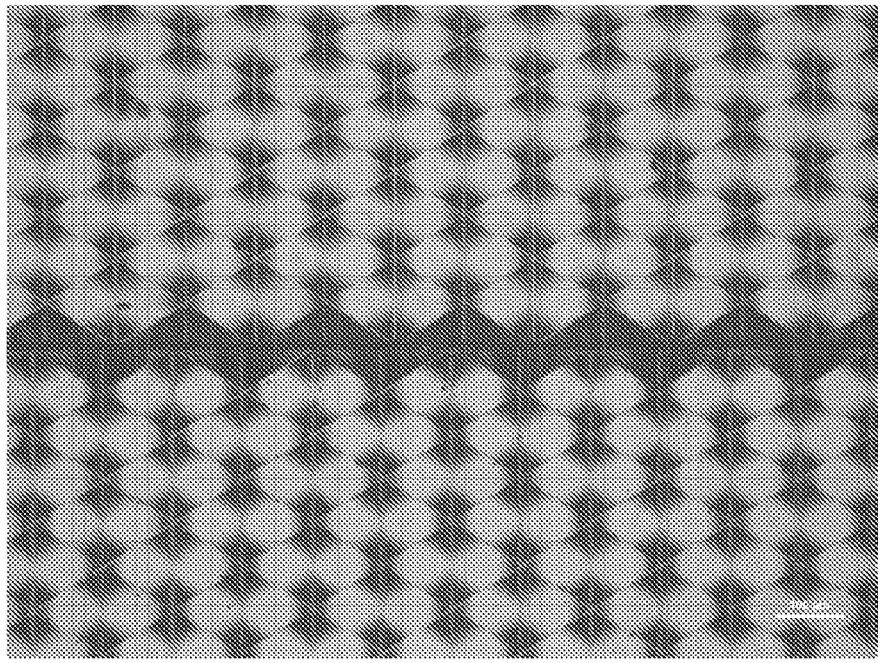
FIG. 14 is a digital picture of the weld of Molding Tool 4.
Figure 15:
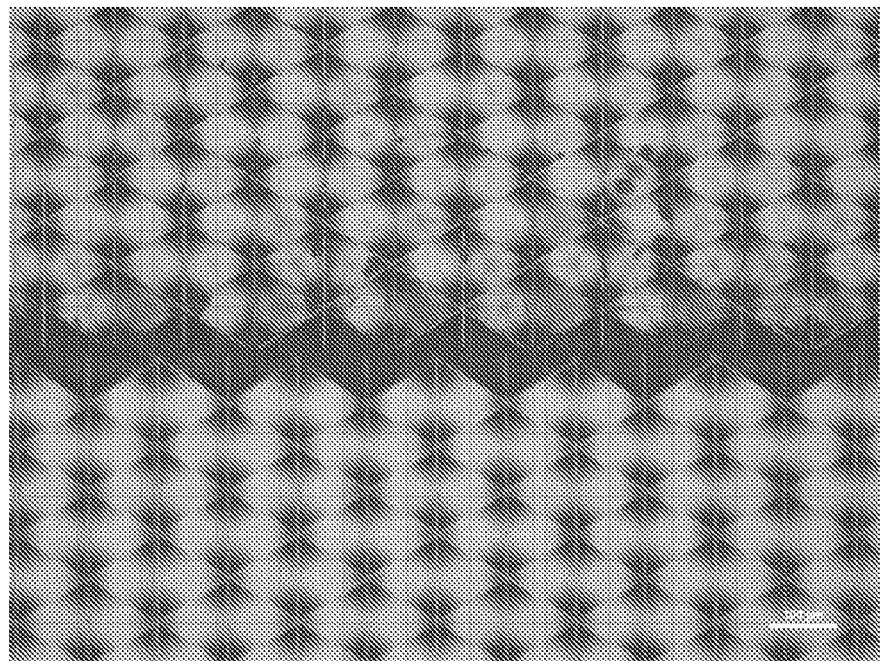
FIG. 15 is a digital picture of the weld of Molding Tool 5.
Figure 16:
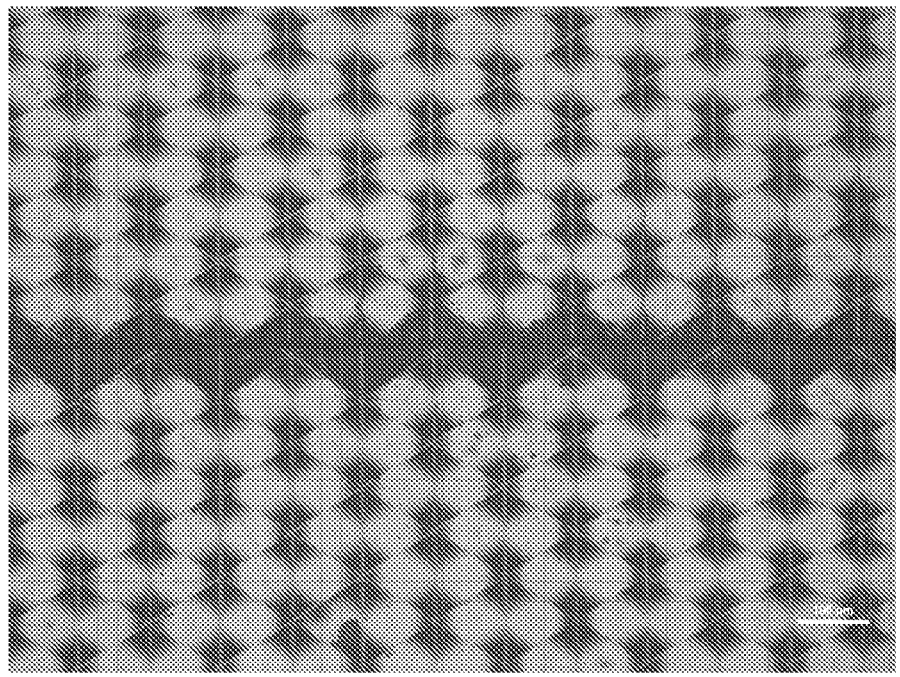
FIG. 16 is a digital picture of the weld of Molding Tool 6.
Figure 17:
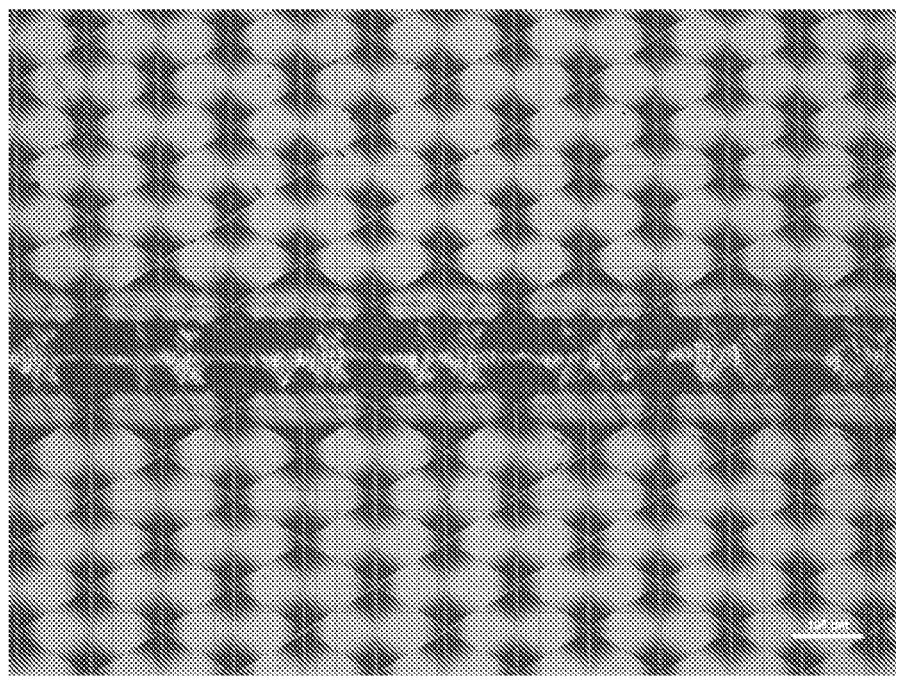
FIG. 17 is a digital picture of the weld of Molding Tool 7.
Figure 18:
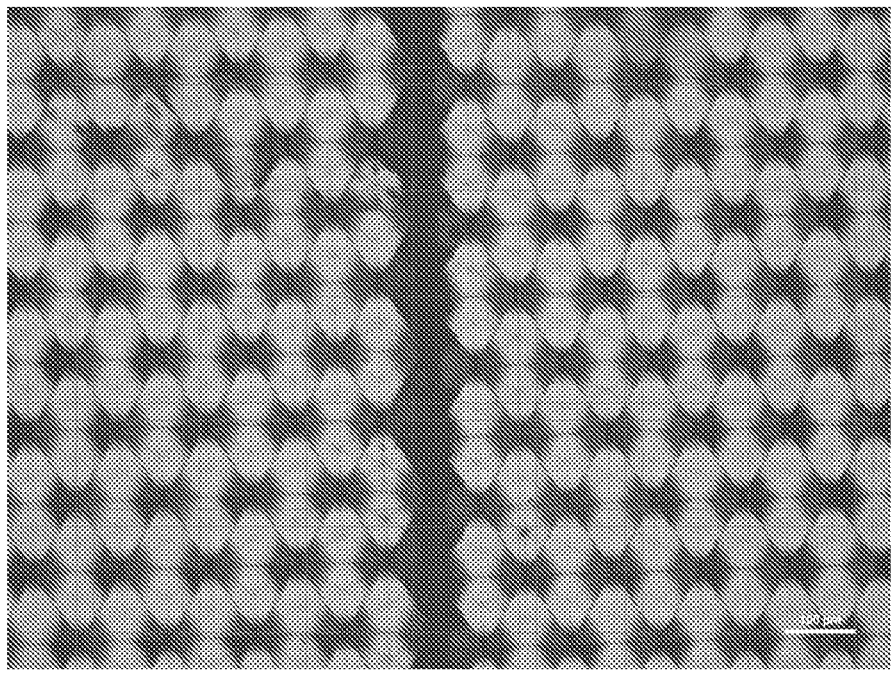
FIG. 18 is a digital picture of the weld of Example 4.
Figure 19:
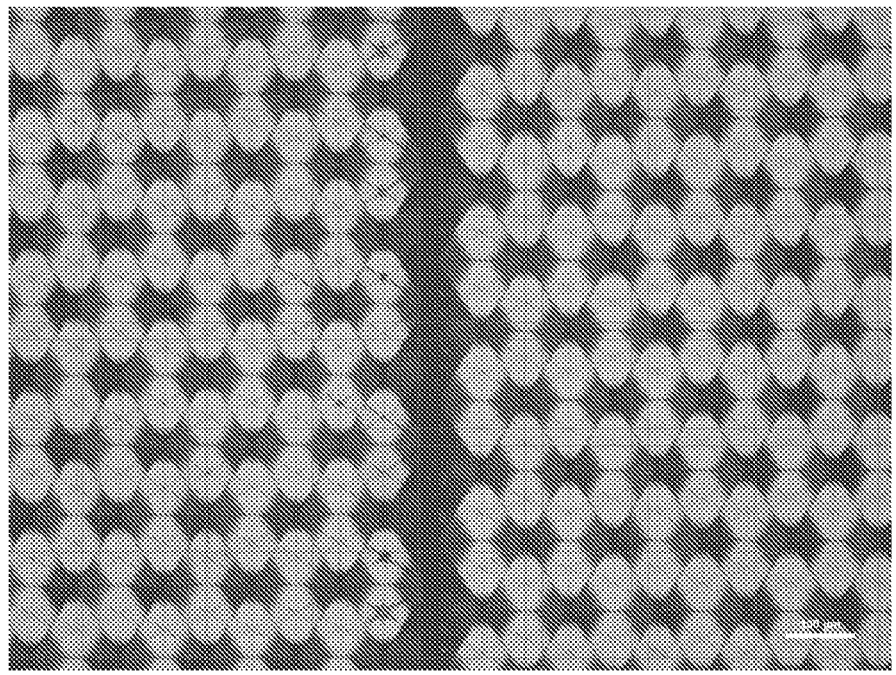
FIG. 19 is a digital picture of the weld of Example 5.
Figure 20:
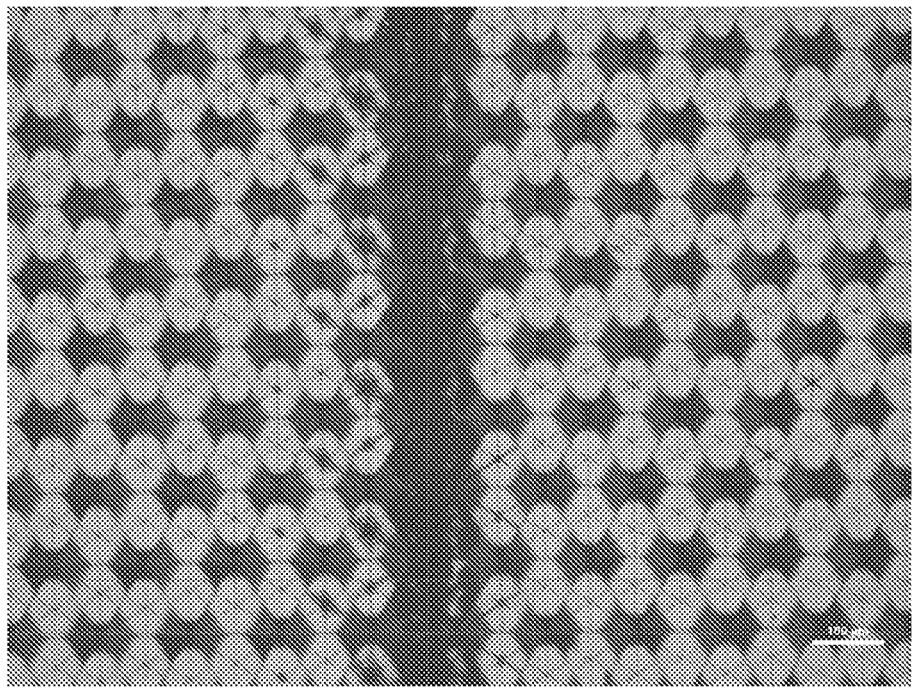
FIG. 20 is a digital picture of the weld of Example 6.
Figure 21:
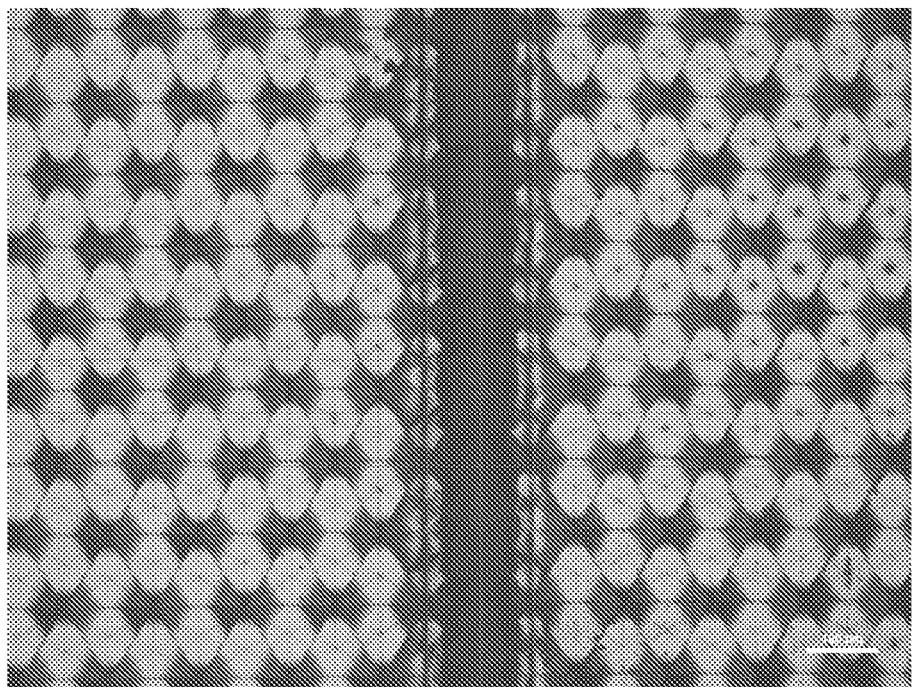
FIG. 21 is a digital picture of the weld of Example 7.

Width of optically degraded areas (in microns) of Comparative Examples A-F and Examples 1-3 was measured as described above. Results are reported in Table 4, below. A representative data set for calculation of the optically degraded area of Example 1 is shown in FIG. 13.

TABLE 4

| Example | Width of optically degraded area (μm) |
|---|---|
| Comparative Example A | 1659 |
| Comparative Example B | 1125 |
| Comparative Example C | 427 |
| Comparative Example D | 499 |
| Comparative Example E | 612 |
| Comparative Example F | 914 |
| Example 1 | 214 |
| Example 2 | 295 |
| Example 3 | 288 |

Examples 4-7

Molding Tools 4-7 were used in the preparation of, respectively, retroreflective films of Examples 4-7 by using a thermal pressing process (1420 PSI, 420° F. for 1 min.) to transfer the microstructured tool into polycarbonate (0.012 inch (0.30 mm) thick Makrolon® 2407 manufactured by Bayer Material Science AG, Germany). The resulting cube-corner structures had three sets of intersecting grooves with a pitch of 4 mils (102 micrometers). The intersecting grooves formed a cube-corner base triangle with included angles of 58° and a cube-corner element height of 1.95 mil (50 micrometers). The primary groove spacing is defined as the groove spacing between the grooves which form the two 58° base angles of the base triangle.

Digital pictures of the welds of Molding Tools 4-7 and Examples 4-7 were taken using a Nikon MM-11C compound microscope with 10× objective lens, and are shown, respectively, in FIGS. 14-21.

Widths of optically degraded areas (in microns) of Molding Tools 4-7 and Examples 4-7 were measured as described above. Results are reported in Table 5, below.

TABLE 5

| Example | Width of optically degraded area (μm) |
| --- | --- |
| Molding Tool 4 | 134 |
| Molding Tool 5 | 201 |
| Molding Tool 6 | 134 |
| Molding Tool 7 | 204 |
| Example 4 | 70 |
| Example 5 | 74 |
| Example 6 | 70 |
| Example 7 | 267 |

Figure 22:
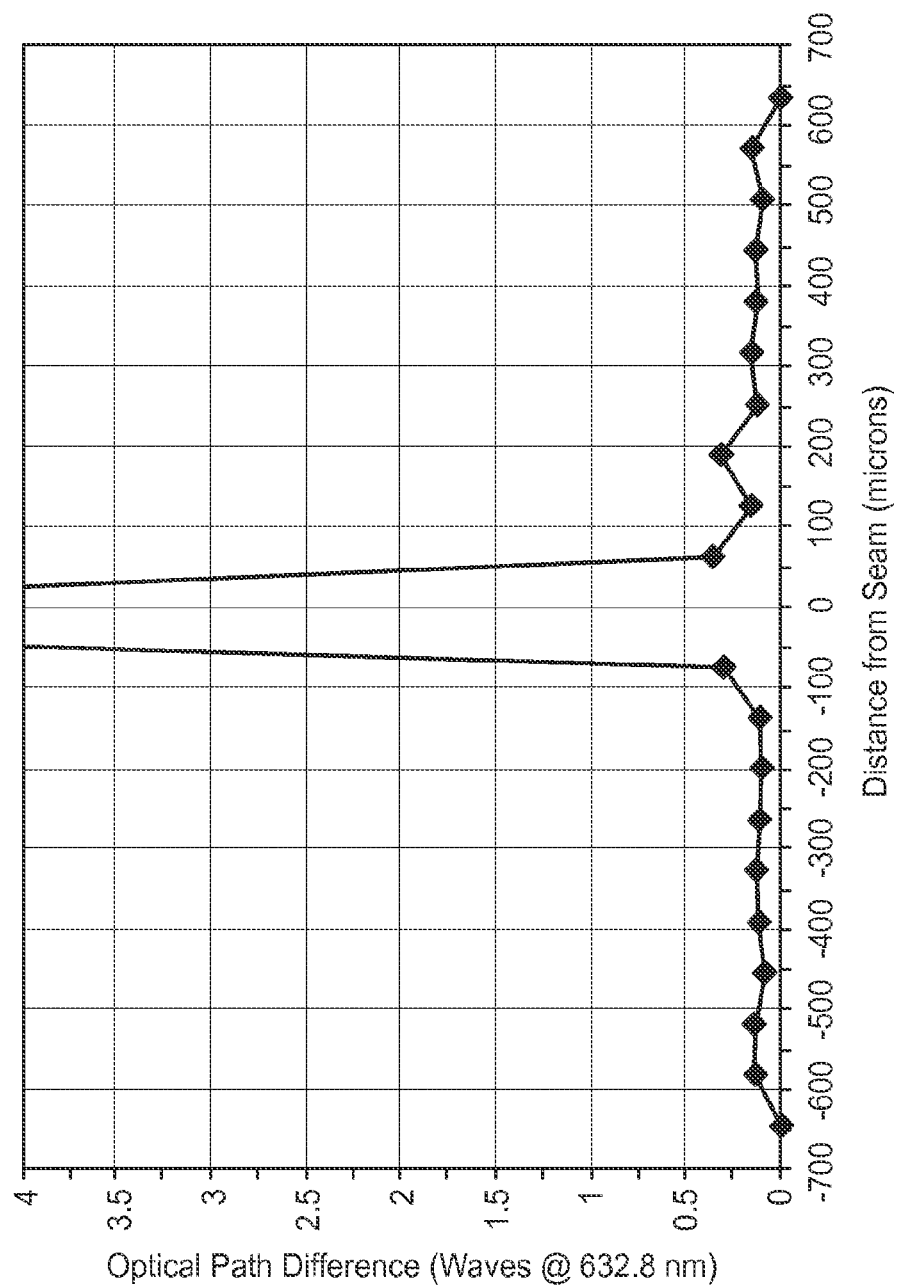
FIG. 22 is a representative data set for calculation of the optically degraded area of Molding Tool 5.
Figure 23:
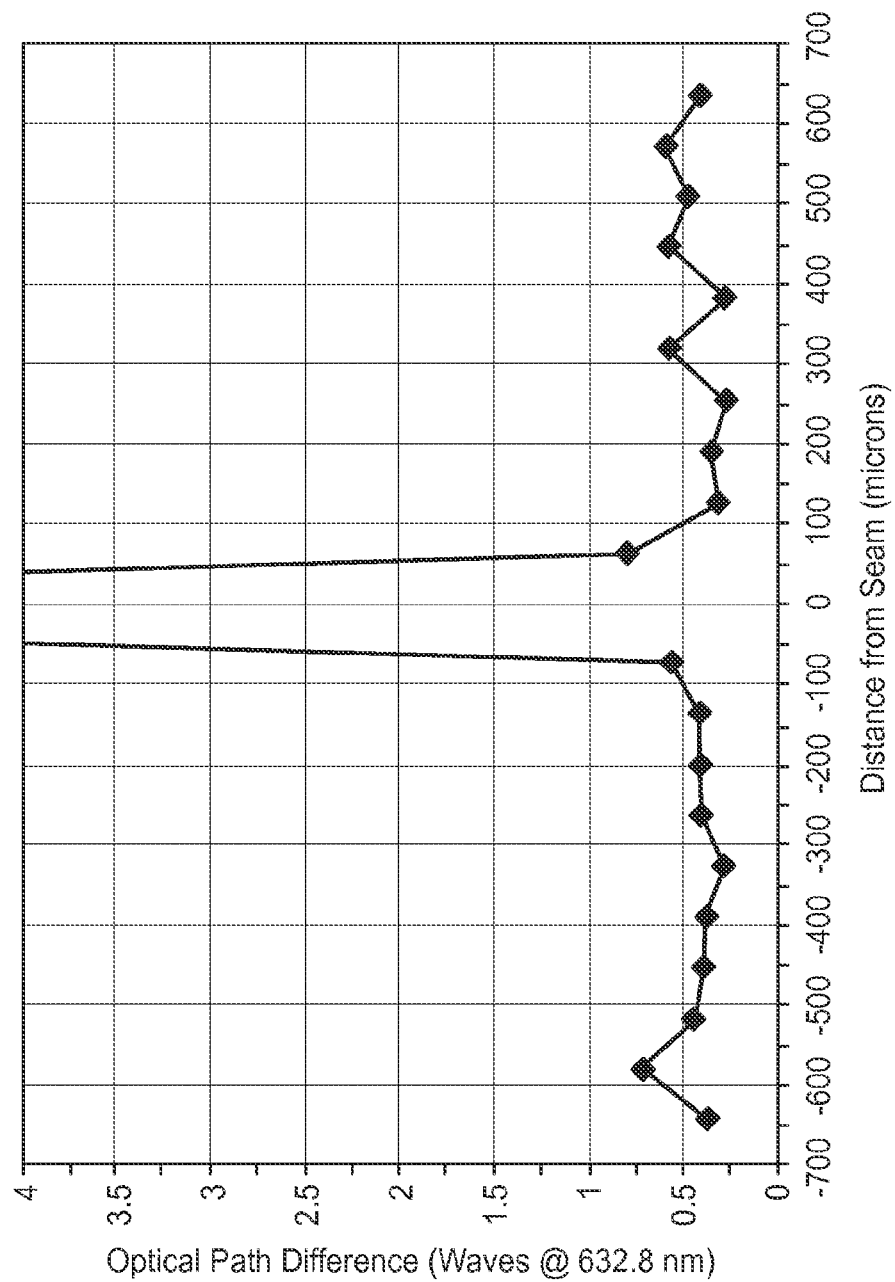
FIG. 23 is a representative data set for calculation of the optically degraded area of Example 5.

Data sets for calculation of the width of the optically degraded area of Molding Tool 5 and Example 5 are shown, respectively, in FIGS. 22 and 23. FIGS. 22 and 23 demonstrate that the general shape of the optically degraded area (as defined by the P-V OPD measurement method described above) did not change between Molding Tool 5 and Example 5. Instead, the replication process introduced additional distortion into the retroreflective cube elements. This additional distortion reduced the impact of the original welding-induced distortion. The use of Equation 1 to identify undistorted cube corner elements resulted in cube corner elements immediately adjacent to the weld (which were identified as distorted cube corner elements in Molding Tool 5) being identified as undistorted cube corner elements in Example 5. This caused the width of the optically degraded area of Example 5 (74 microns) to be smaller than that of Molding Tool 5 (201 microns). Changes in the width of the optically degraded area depend, among other things, upon the tool welding conditions, fidelity of the replication process, and the range of PV-OPD distortion present in each of the retroreflective cube corner elements in the tool.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

I claim:

1. A tool for making retroreflective articles comprising:
    (a) a substrate comprising a patterned surface comprising an array of microstructured retroreflective elements; and
    (b) a welding seam through at least a portion of the array;
    wherein an optically degraded area adjacent the welding seam on the patterned surface has a width of about 400 μm or less.

2. The tool of claim 1 wherein the patterned surface comprises cube corner elements.

3. The tool of claim 1 wherein the width of the optically degraded area is between about 50 μm and about 400 μm.

4. The tool of claim 1 wherein the width of the optically degraded area is about 300 μm or less.

5. The tool of claim 1 wherein the width of the optically degraded area is about 200 μm or less.

6. The tool of claim 1 wherein the width of the optically degraded area is about 100 μm or less.

7. The tool of claim 1 wherein tensile strength of the seam is about 50 kpsi or more.

8. The tool of claim 1 wherein the tool is a cylinder, belt or sleeve.

9. The tool of claim 1 wherein the substrate comprises two tooling elements connected by the welding seam.

10. A retroreflective article replicated from the tool of claim 1 or from a replica thereof.

11. Retroreflective sheeting comprising a patterned surface comprising a three dimensional array of microstructured retroreflective elements and a welding seam through at least a portion of the array; wherein an optically degraded area adjacent the welding seam on the patterned surface has a width of about 400 μm or less.

12. The retroreflective sheeting of claim 11 wherein the patterned surface comprises cube corner elements.

13. The retroreflective sheeting of claim 11 wherein the width of the optically degraded area is between about 50 μm and about 400 μm.

14. The retroreflective sheeting of claim 11 wherein the width of the optically degraded area is about 300 μm or less.

15. The retroreflective sheeting of claim 11 wherein the width of the optically degraded area is about 200 μm or less.

16. The retroreflective sheeting of claim 11 wherein the width of the optically degraded area is about 100 μm or less.

* * * * *